Nov. 29, 1927.

C. W. DAUGHS 1,650,787

STEAM CONNECTION

Filed June 11, 1925

INVENTOR.
C. W. DAUGHS
BY B. J. Craig
ATTORNEY.

Patented Nov. 29, 1927.

1,650,787

UNITED STATES PATENT OFFICE.

CHARLES W. DAUGHS, OF PORTLAND, OREGON.

STEAM CONNECTION.

Application filed June 11, 1925. Serial No. 36,423.

This invention relates to a rotary steam connection.

The general object of the invention is to provide an improved connection which is particularly adapted for use in connecting a rotary mechanism such as a crane with a stationary source of power such as a boiler.

One of the specific objects of the invention is to provide means to supply steam from a stationary boiler to an engine which is rotating and wherein means is provided to return exhaust steam back to the boiler.

Another object of the invention is to provide a rotary steam connection which is so constructed that radial pressure only is employed in effecting a steam tight connection between the parts.

Another object of the invention is to provide a rotary connection wherein a hollow annular member which is provided with an opening in its periphery, coacts with a companion member to allow relative movement between the two members while they are in steam tight engagement.

Figure 1:
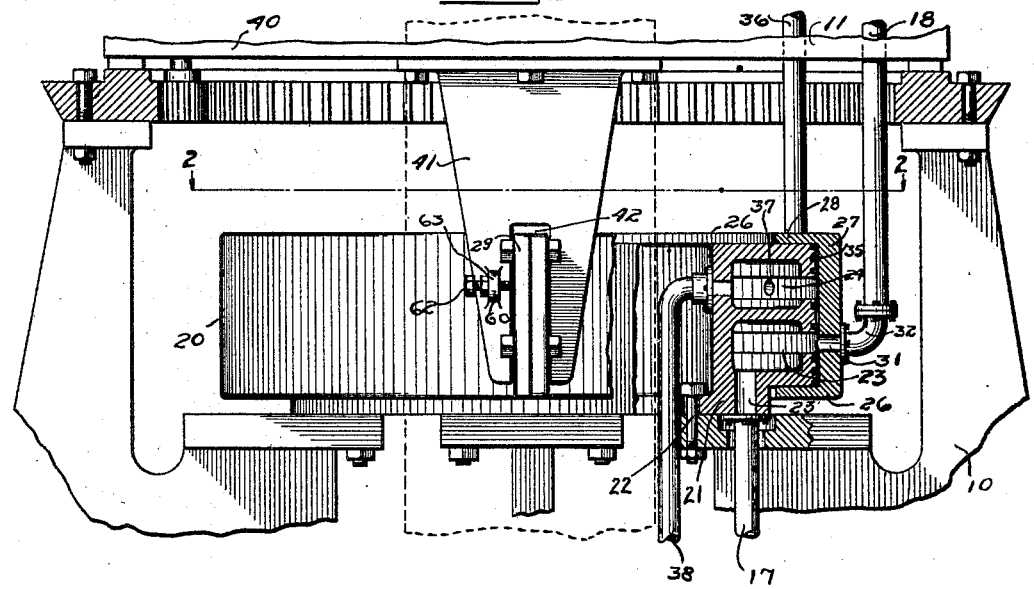
Figures 2, 3:
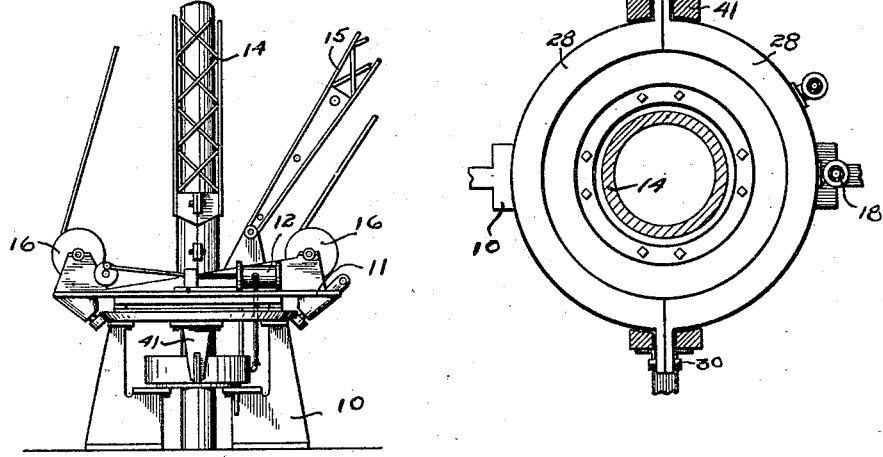

Other objects of the invention will be apparent from the following description taken in connection with the accompanying drawings wherein Fig. 1 is a fragmentary view of a crane showing my invention applied thereto; Fig. 2 is a section on line 2—2, Fig. 1, and Fig. 3 is an elevation of a crane showing my invention.

Referring to the drawing by reference characters, I have shown a foundation standard for a crane at 10. Upon this foundation standard I mount a rotary mechanism 11 which may include a steam engine 12. The device is shown as used in conjunction with a mast 14, a boom 15, and cable drums 16.

The foundation standards 10 are preferably rigidly fixed on a vessel, a railway car or other support and the rotary mechanism is adapted to rotate upon this foundation standard.

The supply of steam may be furnished through a live steam pipe 17 which is adapted to supply steam to the pipe 18 which is in communication with the cylinders of the steam engine 12.

In order that this supply of steam may be constant while the rotary mechanism is sluing back and forth, I have provided a connecting mechanism which is shown at 20. This mechanism comprises an inner member 21 which is shown as bolted to the foundation standard by bolts 22. This member 21 is shown as provided with two internal cavities 23 and 24. The cavity 23 is connected to the live steam pipe 17 by a channel 23'. The member 21 is annular in shape and is provided with peripheral openings 25 leading from the cavities 23 and 24.

In order to close the peripheral openings, I provide a pair of complemental members 26. Each of the members 26 comprises a collar portion 27 having top and bottom flanges 28. The parts of the member 26 are each provided with wings 29 at the end thereof and these wings are provided with aligning apertures through which bolts 30 or other fastening means may be inserted.

The collar 27 is provided with an aperture 31 which aligns with the peripheral openings from the cavity 23 in the valve member 21. A fitting 32 serves to connect the opening 31 with the live steam pipe 18.

From the foregoing description it will be apparent that steam supplied to the cavity 24 in the stationary member 21 through the pipes 17 will be continuously supplied to the pipe 18 while the member 27 rotates about the mast 14.

It is desirable that the connection between the cavity 24 and the fitting 32 be steam tight and in order to effect this and to provide pressure which is radially only, I provide piston rings or other packing 35 upon the outer periphery of the wall of the member 21. These rings engage the inner wall of the collar 27 and the steam-tight joint produced is highly efficient and prevents undue pressure on the rotating parts.

For economical operation it is desirable to return the exhaust steam from the engine to a stationary condenser whence it may be returned to the boiler. To effect this, I connect the exhaust pipe 36 with the cavity 24 through an opening 37. The cavity 24 is connected by a pipe 38 with a condenser (not shown) so that the exhaust steam may be utilized.

In order that the member 26 may move with the rotary mechanism 11, I arrange upon the base plate 40 on the mechanism 11 a pair of diametrically arranged, downwardly extending arms 41. Each of these arms 41 is provided with a slot 42 at its lower end which is adapted to fit over the wings 29. From this construction it will be apparent that when the base plate 40 rotates with the rotary mechanism 11 that it will turn the member 28 with it and will effect a continuous flow of steam. To prevent movement between the arms 41 and the wings 29 I provide a lug 60 on the wing 41. A bolt 62 is threaded through the lug and engages the wing to clamp the latter against the face of the slot 42. A lock nut 63 serves to hold the bolt 42 in place.

Having thus described my invention, I claim:

1. In a steam connection, an annular hollow member, said member having an opening in one wall thereof, a steam pipe communicating with the hollow in said member, a closure for said opening, said closure including a movable member surrounding said hollow member and fitted over said opening, and means to provide a fluid tight connection between said members.

2. In combination with a steam connection, a high pressure steam pipe and an exhaust steam pipe, a second high pressure steam pipe and a second exhaust steam pipe, said last mentioned high pressure steam pipe and exhaust pipe being movable relative to said first mentioned high pressure steam pipe and exhaust pipe, and means to establish communication between the two high pressure steam pipes and the two exhaust steam pipes while they are moving relative to each other, said means including a hollow cylindrical connector having a closure mounted to rotate about the outer periphery of the connector, certain of said pipes being connected to the closure.

3. In a rotary steam connection, a stationary member including a base having an annular hollow member thereon, said member having an opening in its outer periphery, a steam pipe communicating with the hollow in said member, a closure for said member comprising a flanged cylindrical collar fitted over said first mentioned member, said first mentioned member having upper and lower packing rings therein for engaging said closure.

4. In a rotary steam connection, a stationary member including a base having an annular hollow member thereon, said member having an opening in its periphery, a steam feed pipe communicating with the hollow in said member, a closure comprising a cylindrical collar fitted over said member, said collar having top and bottom flanges engaging the top and bottom of said member, said member having packing rings above and below said opening and said last mentioned member having a steam connection.

5. In a rotary steam connection, a stationary member including a base having an annular member thereon, said member having a plurality of cavities therein, said member having openings in its periphery leading to said cavities, a closure for said opening, said closure comprising a cylindrical collar fitted over said member, said closure having top and bottom flanges engaging the top and bottom of said member, a high pressure steam pipe communicating with one of said cavities, a second high pressure steam pipe secured to said cylindrical collar and communicating with the last mentioned cavity, an exhaust steam pipe secured to said collar and communicating with another of said cavities and a second exhaust steam pipe arranged on said member and communicating with the last mentioned cavity.

In testimony whereof, I hereunto affix my signature.

CHARLES W. DAUGHS.